May 27, 1958 G. N. WILLIS ET AL 2,836,324
ARTICLE ORIENTING APPARATUS
Filed June 10, 1955 5 Sheets-Sheet 2

INVENTORS
GRANT N. WILLIS
FRANK A. CLARY, JR.

BY *Lindsey and Pretzman*
ATTORNEYS

May 27, 1958  G. N. WILLIS ET AL  2,836,324
ARTICLE ORIENTING APPARATUS
Filed June 10, 1955  5 Sheets-Sheet 3
FIG. 3
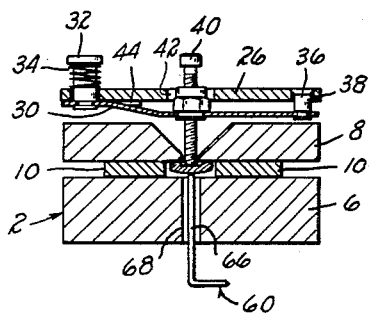
FIG. 15
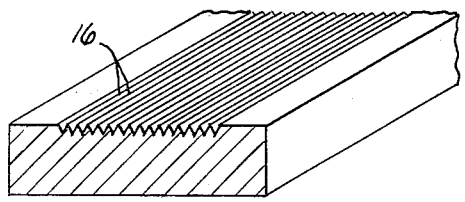
FIG. 4
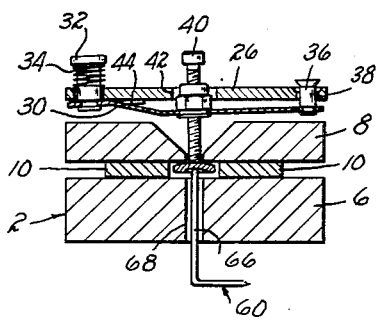
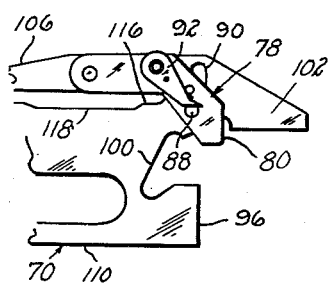
FIG. 5
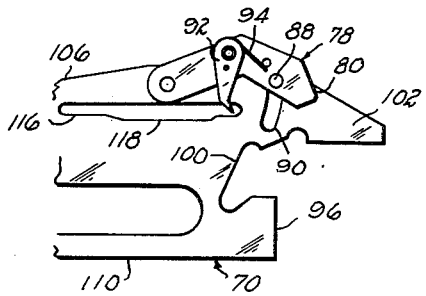
FIG. 6
INVENTORS
GRANT N. WILLIS
FRANK A. CLARY, JR.
BY Lindsey and Prutzman
ATTORNEYS

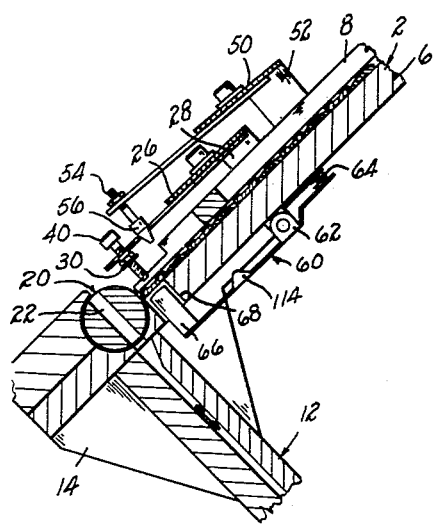
FIG. 7
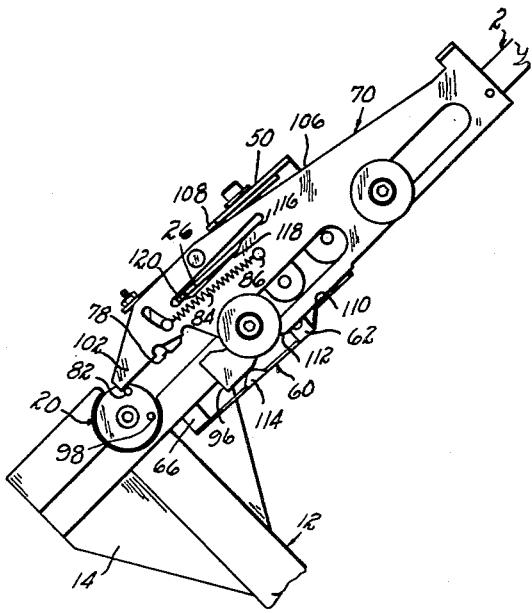
FIG. 8
FIG. 9
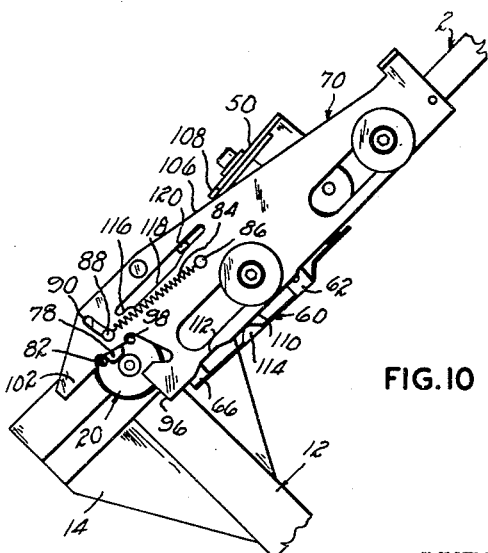
FIG. 10
INVENTORS
GRANT N. WILLIS
FRANK A. CLARY, JR.

May 27, 1958  G. N. WILLIS ET AL  2,836,324
ARTICLE ORIENTING APPARATUS
Filed June 10, 1955  5 Sheets-Sheet 5

INVENTORS
GRANT N. WILLIS
FRANK A. CLARY, JR.

BY Lindsey and Prutzman
ATTORNEYS

United States Patent Office 2,836,324
Patented May 27, 1958.

2,836,324

ARTICLE ORIENTING APPARATUS

Grant N. Willis and Frank A. Clary, Jr., Bristol, Conn., assignors, by mesne assignments, to A. J. Mitchell Co., Boston, Mass., a corporation of Massachusetts Application June 10, 1955, Serial No. 514,590

15 Claims. (Cl. 221—13)

The present invention relates to apparatus for feeding and orienting articles having opposite sides differentiated by a difference in contour, such as buttons or the like having a concave side and a non-concave side. More particularly, the invention relates to feeding and orienting apparatus for such articles which is capable of receiving the articles in randomly arranged condition and delivering the articles in uniformly oriented relation.

Many operations in manufacturing and other fields involve the processing of a succession of identical articles through a particular operating station. When the articles involved have opposite sides differing in contour and must be arranged during processing with one side or the other facing in a particular direction, as buttons must be arranged for example before being sewed onto cloth, it is desirable that the articles be uniformly arranged to face in the right direction before their arrival at the operating station. Accordingly, it is an object of the present invention to provide feeding and orienting apparatus for such articles which is capable of receiving a succession of such articles in disarranged relation and delivering the articles in uniformly oriented relation at a rapid rate.

Another object is to provide apparatus for orienting such articles which is simplified in construction yet completely automatic in operation.

Another object is to provide feeding and orienting apparatus for such articles which has a high degree of sensitivity to differences in contour between the opposite sides of the articles and is therefore capable of dependable and accurate operation for long periods without attention or adjustment.

Another object is to provide apparatus of the character described which is particularly suitable for orienting buttons or the like and which may be readily adjusted to accommodate a wide range of button sizes.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

Figure 3 is an enlarged partial sectional view of the structure of Figure 1 taken on the line 3—3 of Figure 2 and showing the article sensing portion of the apparatus in engagement with an article in right side up relation;

Figure 4 is a view similar to Figure 3 showing the article sensing portion of the apparatus in engagement with an article in the right side down condition;

Figure 5 is a fragmentary side view of another portion of the apparatus;

Figure 6 is a view similar to Figure 5;

Figure 7 is a longitudinal sectional view of a portion of the apparatus shown in Figures 1 and 2 taken on the line 7—7 of Figure 2 and showing the condition of the parts at the beginning of the article selection cycle;

Figure 8 is a side view of a portion of the structure of Figures 1 and 2 showing the parts in the same position as shown in Figure 7;

Figure 9 is a view similar to Figure 7 showing the position of the parts at an intermediate point in an article selection cycle;

Figure 10 is a view similar to Figure 8, but with the parts positioned corresponding to Figure 9;

Figure 15 is a fragmentary perspective view of a portion of the apparatus.

Figure 1:
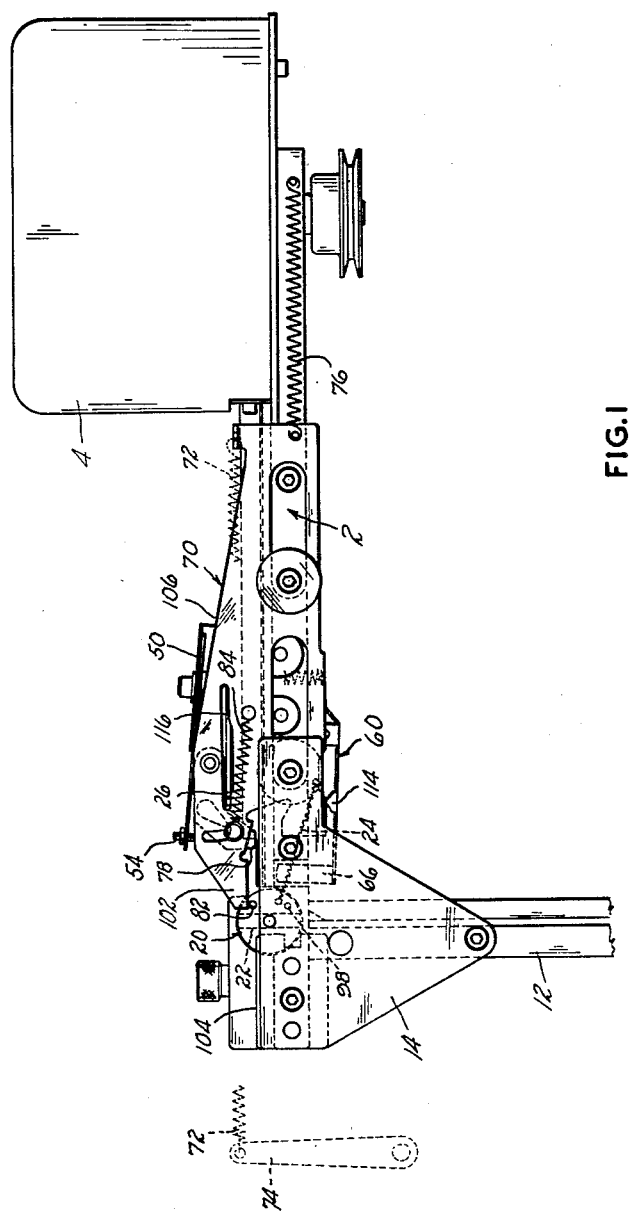
Figure 1 is a side view of an article feeding and orienting apparatus constructed in accordance with the invention.
Figure 2:
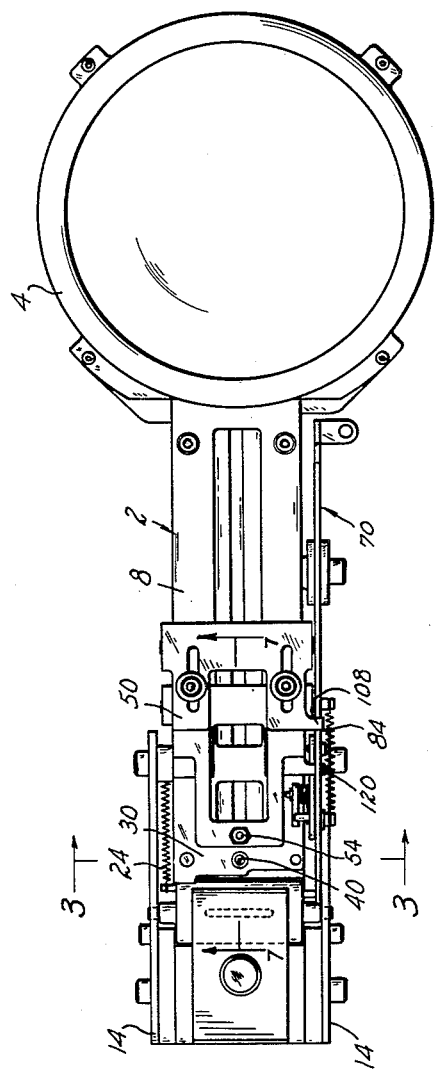
Figure 2 is a top view of the structure shown in Figure 1.

While the invention has utility in connection with the feeding of various articles having opposite surfaces differentiated by a difference in contour, for convenience the invention will be described in connection with the feeding of buttons having a concave top surface and a flat bottom surface. Referring to the drawings, an article feeding apparatus constructed in accordance with the invention includes a longitudinally extending downwardly inclined upper chute 2 into the upper end of which a succession of buttons may be supplied from any suitable source, such as a rotary hopper 4. The chute 2 is preferably inclined at an angle of about 45 degrees and includes a base or floor 6, a centrally slotted cover 8 and sides 10 spaced so that the buttons accommodated in the chute lie flat and may slide freely down to the lower end of the chute in a row. Sides 10 are laterally adjustable to accommodate a wide range of button sizes. The buttons entering the chute are arranged at random with either their top or bottom surface facing the floor of the chute. Extending from adjacent the lower end of upper chute 2 is a similar lower chute 12 which is downwardly inclined perpendicular to the upper chute and is fastened thereto on opposite sides by a pair of connecting plates 14. The floor of each chute 2, 12 is longitudinally furrowed as shown at 16 in Figure 15 to reduce friction and minimize static electricity effects on the buttons.

In accordance with the invention, each button in turn is transferred from the upper chute 2 to the lower chute 12, the transfer being effected in such a way that each button is placed in the lower chute in right side up relation, i. e., with its bottom surface in contact with the floor of the lower chute, regardless of whether it was disposed in right side up or right side down relation in the upper chute. According to the invention, the means for effecting such transfer of the buttons includes a rotor 20 disposed at the intersection of the two chutes and journaled in the plates 14 for rotation about a transverse axis aligned with both chutes. The rotor shown is cylindrical in shape and has a diametrical slot 22 provided with internal longitudinal furrows similar to furrows 16 for free sliding accommodation of a button. A spring 24 biases the rotor to a rest position such that the slot is aligned with lower chute 12, but permits the rotor to be rotated from its rest position in either direction sufficiently to register either end of its slot 22 in button receiving relation with upper chute 2. With this arrangement, if rotor 20 is initially rotated from its rest position 90 degrees counterclockwise as shown in Figure 1 to its button receiving position, a button will enter the slot 22 from the upper chute, and if the rotor is then rotated 90 degrees clockwise back to its rest position, the button will be transferred into lower chute 12 and will be placed in the lower chute in the same relative position, i. e. right side up or right side down, as it had in upper chute 2. However, if the rotor is initially rotated 90 degrees in a clockwise direction from its rest position to button receiving position and then is returned counterclockwise to its rest position, the button transferred will be turned over during the transfer process, and hence will be placed in the lower chute in a relative position opposite to that which it had in the upper chute. Thus during transfer from the upper chute to the lower chute, a button will be inverted or not, depending upon whether the direction of movement of the rotor is initially clockwise or counterclockwise.

Further in accordance with the invention, rotor 20 is arranged to be continuously oscillated between its rest position and either of its button receiving positions so as to maintain a continuous flow of buttons from upper chute 2 to lower chute 12, and the direction of initial movement of the rotor during oscilaltion is controlled according to the relative position of each respective button in the upper chute so as to invert those buttons which require inversion during transfer without inverting those which do not. To this end the apparatus includes means to sense the relative position of each successive button arriving at the lower end of the upper chute. The sensing means includes a feeler plate 26 which overlies the upper chute and is adjustably connected thereto by arms 28 for pivoting movement about a transverse axis. Spaced beneath the feeler plate 26 is a transversely extending feeler bar 30, as best shown in Figure 3, having an upwardly bent end resiliently connected to the feeler plate by a stud 32 and a light compression spring 34 for limited pivoting movement perpendicular to the feeler plate 26. On the opposite end of the feeler bar is an upstanding catch stud 36 freely slidable in an opening 38 in feeler plate 26 and having an enlarged head normally flush with the top surface of the feeler plate. Also carried by the feeler bar 30 is a depending feeler pin 40 of adjustable length freely accommodated in an opening 42 in the feeler plate and arranged to extend through the central slot in the cover and engage the lowermost button in chute 2 upon depression of the feeler plate 26 and feeler bar 30 toward the chute. With this arrangement, when pin 40 is elevated relative to feeler plate 26, bar 30 pivots and extends stud 36 above the surface of the feeler plate. A transverse finger 44 integral with feeler bar 30 forms a fulcrum therefor closer to the axis of the feeler pin than the stud 32, thereby amplifying the movement of stud 36.

The movement of buttons down the upper chute 2 is regulated by an escapement including a hold-back plate 50 overlying the chute and adjustably supported thereon by arms 52 for pivoting movement about a transverse axis, as shown in Figure 7. The hold-back plate carries a hold-back pin 54 of adjustable length having a friction tip 56 of rubber or the like which, upon depression of the hold-back plate, is adapted to engage the next to lowest button in chute 2 and prevent it from sliding further down the chute.

Cooperating with the feeler pin 40 is a button lifter or selection detent 60 supported on the underside of chute 2 by arms 62 for pivoting movement about a transverse axis and urged clockwise by a spring 64. The button selection detent has an upstanding finger 66 freely accommodated in a slot 68 in the floor of the chute and arranged to engage the underside of the lowermost button in the chute.

Figure 12:
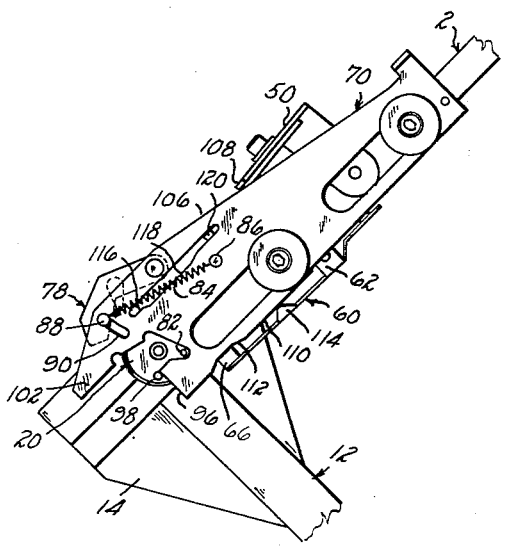
Figure 12 is a view similar to Figure 10 but with the parts positioned corresponding to Figure 11.

The rotor is oscillated under the control of the button sensing means by a slide 70 mounted on the base of the upper chute for longitudinal reciprocating motion. The slide 70 is arranged to be driven in a forward direction through a tension compliance spring 72 operated by any suitable means such as an oscillating arm 74. Return movement of the slide is effected by a return spring 76 extending between the slide and the base 6 of chute 2. Pivotally mounted on the slide is a finger 78, as best shown in Figures 5 and 12 having a forwardly facing shoulder 80 normally aligned with an eccentric projecting pin 82 on rotor 20 and arranged to cooperate therewith to turn the rotor in a counterclockwise direction as viewed in Figure 1 when the slide is moved forward The finger is biased into a position of alignment with the rotor pin 82 by a spring 84 connected between an anchor pin 86 on the slide and a stud 88 on finger 78 received in an arcuate slot 90 in the slide concentric with the pivot axis of finger 78. The finger carries a pivotable pawl 92 on its inner side as best shown in Figures 5 and 6. The pawl 92 is biased clockwise as shown in Figure 6 by a spring 94 and is positioned so that its free end wipes the top surface of the feeler plate 26 in line with the catch stud 36.

The slide 70 is also formed with a fixed lower jaw having a forwardly facing shoulder 96 arranged to cooperate with another projecting pin 98 on rotor 20 when the slide is moved forward so as to turn the rotor in a clockwise direction as viewed in Figure 1. The slide is relieved as at 100 to accommodate the pins 82, 98 during the turning of rotor 20 in either direction, and the shoulder 96 is spaced rearwardly of shoulder 80 on finger 78 sufficiently so that during forward movement of slide 70 engagement of shoulder 80 with pin 82 may rotate the rotor counterclockwise without interference between the pin 98 and shoulder 96. A forwardly extending nose 102 on the slide provides a stop against which pin 82 engages in the rest position of rotor 20, and to the plate 14 adjacent the pins 82, 98 is secured a stop 104 as shown in Figure 1 with which the pins 82, 98 may engage to limit rotation of the rotor to 90 degrees in either direction from its rest position.

The slide 70 is also arranged to coordinate the operation of the feeler pin 40, hold-back pin 54, and selection detent 60. To this end the top edge of the slide is formed with an elongate cam surface 106 which is rearwardly and downwardly inclined toward the upper chute and is engaged by a transverse ear 108 on the hold-back plate 50. On the lower edge of the slide is another cam surface 110 which is formed with a shallow notch 112 and which cooperates with an upstanding ear 114 on the selection detent 60. The slide has a slot forming a third cam surface 116 having a depressed central portion 118 with which cooperates an ear 120 on the feeler plate 26.

Figure 13:
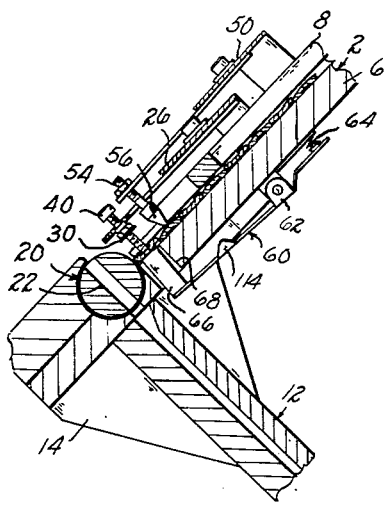
Figure 13 is a view similar to Figures 7 and 9, but showing the position of the parts at a point in the article selection cycle preceding that shown in Figure 9.
Figure 14:
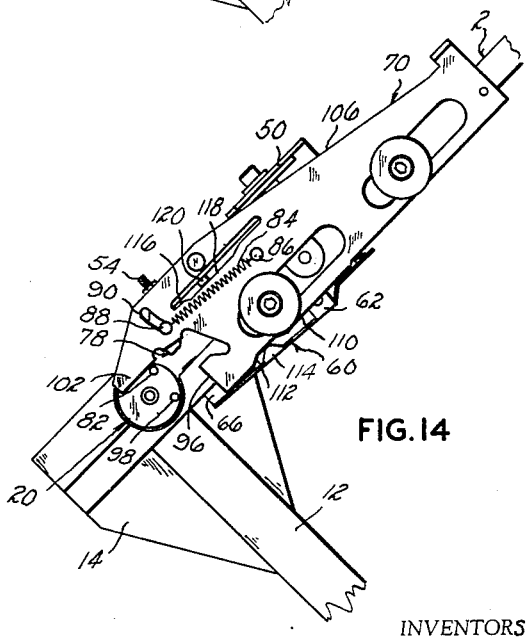
Figure 14 is a view similar to Figure 8 showing the parts in the position corresponding to Figure 13.

In the operation of the apparatus, buttons are admitted to the upper chute 2 in random arrangement with either their top surfaces or bottom surfaces facing the floor of the chute, and slide freely down the chute to its lower end where the lowermost button engages the outer surface of the rotor 20 and is stopped. The position of the various parts of the apparatus at the beginning of a button transferring operation is shown in Figures 7 and 8 wherein it will be seen that the slide 70 is retracted to its uppermost position, the rotor 20 is in its rest position, the feeler plate 26 and hold-back plate 50 are raised, and the selection detent 60 is depressed. The transfer operation is begun by the advance of slide 70 toward the lower end of the upper chute. As the slide moves forward, ear 120 on feeler plate 26 drops into the central depression of the cam surface 116 and permits the feeler plate to drop down toward the upper chute and engage feeler pin 40 with the center of the upper surface of the bottom button therein. As the slide moves further forward, the engagement of ear 108 with cam surface 106 allows hold-back plate 50 to drop down sufficiently to engage hold-back pin 54 with the next to the bottom button in the chute, as shown in Figure 13. The notch 112 in cam surface 110 also registers with the ear 114 on selection detent 60, permitting spring 64 to pivot the selection detent clockwise as shown in Figures 13 and 14 so that the upstanding finger 66 engages the lower surface of the lowermost button in the chute and presses it firmly against the chute cover 8, as shown in Figures 3 and 4. When this happens, if the button engaged by the feeler pin is right side down, i. e., if its concave top surface faces the bottom of the chute as shown in Figure 4, the feeler pin 40 will be raised sufficiently relative to feeler plate 26 to pivot the feeler bar 30 about the end of finger 44 and extend the catch stud 36 above the surface of the feeler plate. If the button is right side up, however, the feeler pin will be accommodated in the depression of the top surface of the button and will not be raised, and the head of catch stud 36 will therefore remain flush with the feeler plate as shown in Figure 3. Lifting of the buttons up against the cover 8 of the chute in this manner eliminates the possibility of errors in sensing due to variations in the overall thickness of the buttons, because with this arrangement the difference between the elevation of feeler pin 40 when a button is right side down and its elevation when a button is right side up is due solely to the depth of the depression or concavity in the top surface of the button. Thus the sensing arrangement described is particularly sensitive and dependable in operation even with buttons or other articles whose overall dimensions may not be exactly uniform.

Figure 11:
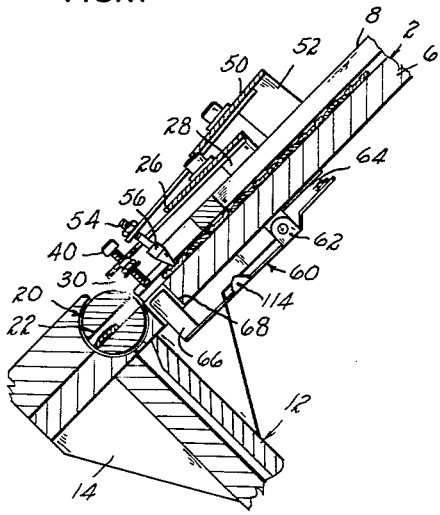
Figure 11 is a view similar to Figure 7, but showing the position of the parts in another article selection cycle.

Further forward movement of slide 70 brings pawl 92 to the feeler bar catch stud 36. If the stud 36 is extended, it will engage the free end of pawl 92 and cause the pawl to pivot, leap-frog fashion, thereby raising the finger as shown in Figures 6 and 12 and removing shoulder 80 from alignment with pin 82. This conditions the slide for engagement of shoulder 96 with pin 98 so that, as the slide moves further forward, rotor 20 will be turned clockwise to the button receiving position shown in Figures 11 and 12. If, during the forward movement of the slide, the feeler bar catch stud 36 is not extended, pawl 92 will not pivot and finger 78 will not be raised but will engage pin 82 and turn the rotor counterclockwise to the button receiving position shown in Figures 9 and 10. Thus it may be seen that the rotor is turned from its rest position to respective button receiving positions in which one end or the other of slot 22 is brought into registry with the upper chute, depending upon whether the bottom button in the chute is right side down or right side up. The slide is stopped by the engagement of pin 82 with stop 104 sooner than it is when pin 98 engages the stop, and this difference in slide travel is accommodated by compliance spring 72.

As the slide reaches its lowermost position, ear 120 of feeler plate 26 is elevated by the right-hand end of cam surface 116, and ear 114 of selection detent 60 is depressed by the right-hand end of cam surface 110, thereby withdrawing the detent finger 66 and feeler pin 40 from contact with the bottom button and permitting the bottom button to slide freely into the slot 22 of rotor 20. The slide is then allowed to return to its uppermost position and spring 76 returns the rotor to its rest position, the return rotation of the rotor being such as to invert a button which had been right side down in the upper chute but not invert a button which had been right side up in the upper chute. When the rotor reaches its rest position, slot 22 registers with the lower chute 12 and the button in the slot slides out of the rotor and into the lower chute, from which it may subsequently be fed to any desired work station. Thus, in the operation of the apparatus, buttons will automatically be discharged into lower chute 12 in right side up relation, regardless of their original orientation in the upper chute 2.

As the slide returns to its uppermost position, cam surface 106 raises ear 108 and lifts hold-back plate 50, thereby permitting the row of buttons in the upper chute to index forward and bring the next button beneath the feeler pin 40, and the apparatus is then conditioned for the next button transfer operation.

While in the apparatus above described the rotor is arranged to return to a rest position in which the slot 22 is aligned with the lower chute 12, and to rotate to loading position one way or the other depending on the relative position of the leading article, it will be appreciated that the rest position of the rotor might alternatively be such that the slot is aligned with upper chute 2 and the article enters the slot before any rotor movement takes place, in which case the relative position of the leading article would determine the direction of rotation of the rotor to discharging position. Both such alternatives are contemplated by the present invention, the principle of operation being the same in each case, namely that the rotor is so rotated as to discharge the article from the same end of the rotor slot which it enters when no inversion is required and to discharge the article from the end of the slot opposite that which it enters when inversion is required.

Thus it may be seen that an article feeding apparatus constructed in accordance with the present invention is completely automatic in operation and capable of uniformly orienting buttons or other such articles at a rapid rate. Since the chutes as well as the means for sending the relative disposition of the articles in the upper chute are readily adjustable, the apparatus can conveniently accommodate various sizes of buttons or other articles. The apparatus is extremely sensitive to contour differences and free from errors due to variation in overall dimensions of the buttons or other articles, and hence is capable of dependable and accurate operation for long periods without attention.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language might be said to fall therebetween.

We claim:

1. In an apparatus for uniformly orienting articles having opposite surfaces differentiated by a difference in contour, a first chute adapted to accommodate a succession of articles arranged at random either right side up or right side down relative to the first chute, a second chute angularly disposed relative to the first chute and having its entrance end adjacent the exit end of the first chute, article transfer means disposed between the exit end of the first chute and the entrance end of the second chute, said transfer means having a passage extending therethrough and being movable between an article receiving position wherein an end of the passage registers with the first chute and an article discharging position wherein an end of the passage registers with the second chute, sensing means located at the first chute for engaging one of said opposite surfaces of the leading article in the first chute to determine whether its relative position is right side up or right side down, driving means engageable with the transfer means for moving the transfer means between article receiving position and article discharging position selectively in one direction or the other, and means responsive to the sensing means for conditioning the driving means to drive the transfer means in a direction according to the relative position of the article in the first chute.

2. In an apparatus for uniformly orienting articles having opposite surfaces differentiated by a difference in contour, a first chute adapted to accommodate a succession of articles positioned at random with their opposite surfaces either right side up or right side down relative to the first chute, a second chute angularly disposed relative to the first chute and having its entrance end adjacent the exit end of the first chute, article transfer means disposed between the exit end of the first chute and the entrance end of the second chute, said transfer means having a passage extending therethrough and being movable between an article receiving position wherein the passage registers with the first chute and receives an article therefrom and an article discharging position wherein the passage registers with the second chute, sensing means located at the first chute for engaging one of said opposite surfaces of the leading article in the first chute to determine whether its relative position is right side up or right side down, means biasing the transfer means to one of said positions, reciprocal driving means engageable with the transfer means which is shiftable to move the transfer means between said one position and the other position selectively in either direction, and means responsive to the sensing means for shifting the driving means according to the relative position of the article in the first chute.

3. In an apparatus for uniformly orienting articles having opposite surfaces differentiated by a difference in contour, a first chute adapted to accommodate a succession of articles arranged at random either right side up or right side down relative to the first chute, a second chute angularly disposed relative to the first chute and having its entrance end adjacent the exit end of the first chute, article transfer means disposed between the exit end of the first chute and the entrance end of the second chute, said transfer means having a passage extending therethrough and being rotatable between an article discharging position wherein one end of the passage registers with the second chute and respective article receiving positions wherein alternate ends of the passage register with the first chute, sensing means associated with the first chute for sensing the relative position of the leading article in the first chute, driving means engageable with the transfer means and shiftable to move the transfer means from article discharging position selectively to either one of said article receiving positions, and means responsive to the sensing means for shifting the driving means responsive to the relative position of the leading article in the first chute.

4. In an apparatus for uniformly orienting articles having opposite surfaces differentiated by a difference in contour, a first inclined chute adapted to accommodate a succession of articles positioned at random either right side up or right side down relative to the first chute, a second inclined chute angularly disposed relative to the first chute and having its entrance end adjacent the exit end of the first chute, rotatable article transfer means disposed between the exit end of the first chute and the entrance end of the second chute, said transfer means having an article receiving passage extending therethrough and being rotatable between an article discharging position wherein one end of the passage registers with the second chute and respective article receiving positions wherein opposite ends of the passage register with the first chute, sensing means associated with the first chute for sensing the relative position of the leading article therein, driving means controlled by the sensing means and engageable with the transfer means for rotating the transfer means from said article discharging position selectively to either one of said article receiving positions, and means for returning said transfer means in the opposite direction to said article discharging position.

5. In an apparatus for uniformly orienting articles having opposite surfaces differentiated by a difference in contour, a first inclined chute adapted to accommodate a succession of articles positioned at random either right side up or right side down relative to the first chute, a second inclined chute angularly disposed relative to the first chute and having its entrance end adjacent the exit end of the first chute, said first and second chutes having floors provided with furrowed surfaces, rotatable article transfer means disposed between the exit end of the first chute and the entrance end of the second chute, said transfer means having an article receiving passage extending therethrough and being rotatable between an article discharging position wherein one end of the passage registers with the second chute and respective articles receiving positions wherein opposite ends of the passage register with the first chute, said passage having furrowed internal surfaces, sensing means associated with the first chute and engageable with one of said opposite surfaces of the leading article in the first chute for sensing the relative position of the leading article therein, driving means controlled by the sensing means and engageable with the transfer means for rotating the transfer means from said article discharging position in either direction to one of said article receiving positions, and biasing means for returning said transfer means to said article discharging position.

6. In an apparatus for uniformly orienting articles having opposite surfaces differentiated by a difference in contour, a first chute adapted to accommodate a succession of articles positioned at random with their opposite surfaces either right side up or right side down relative to the first chute, a second chute angularly disposed relative to the first chute and having its entrance end adjacent the exit end of the first chute, article transfer means disposed between the exit end of the first chute and the entrance end of the second chute, said transfer means having a passage extending therethrough and being rotatable between an article discharging position wherein one end of the passage registers with the second chute and respective article receiving positions wherein opposite ends of the passage register with the first chute, a feeler pin arranged to engage the upwardly facing surface of the leading article in the first chute to gauge the contour thereof, driving means controlled by the position of the feeler pin relative to the first chute for rotating the transfer means to one of the said article receiving positions, and means for returning the transfer means to article discharging position.

7. In an apparatus for uniformly orienting articles having opposite surfaces differentiated by a difference in contour, a first chute having a base, a cover, and sides dimensioned to accommodate a succession of articles with their opposite surfaces positioned at random either right side up or right side down relative to the first chute, a second chute angularly disposed relative to the first chute and having its entrance end adjacent the exit end of the first chute, rotatable article transfer means disposed between the exit end of the first chute and the entrance end of the second chute, said transfer means having a passage extending therethrough and being rotatable between an article discharging position wherein one end of the passage registers with the second chute and respective article receiving positions wherein opposite ends of the passage register with the first chute, a feeler pin arranged to engage the upwardly facing surface of the leading article in the first chute to gauge the contour thereof, means for lifting said leading article against the cover of the first chute during its engagement by said feeler pin, driving means controlled by the position of the feeler pin relative to the first chute cover when the leading article is lifted for rotating the transfer means to one of the said article receiving positions, and means for returning the transfer means to article discharging position.

8. In an apparatus for uniformly orienting articles having opposite surfaces differentiated by a difference in contour, a first chute having a longitudinally furrowed floor, a cover, and sides dimensioned to accommodate a succession of articles with their opposite surfaces positioned at random either right side up or right side down relative to the first chute, a second chute angularly disposed relative to the first chute having a longitudinally furrowed floor and having its entrance end adjacent the exit end of the first chute, rotatable article transfer means disposed between the exit end of the first chute and the entrance end of the second chute, said transfer means having a passage extending therethrough and being rotatable between an article discharging position wherein one end of the passage registers with the second chute and respective article receiving positions wherein opposite ends of the passage register with the first chute, said passage having longitudinally furrowed surfaces, a feeler pin arranged to engage the upwardly facing surface of the leading article in the first chute to gauge the contour thereof, means for lifting said leading article against the cover of the first chute during its engagement by said feeler pin, driving means controlled by the position of the feeler pin relative to the first chute cover when the leading article is lifted for rotating the transfer means to one of the said article receiving positions, and means for returning the transfer means to article discharging position.

9. In an apparatus for uniformly orienting articles having opposite surfaces differentiated by a difference in contour, a first chute adapted to accommodate a succession of articles with their opposite surfaces positioned at random either right side up or right side down relative to the first chute, a second chute angularly disposed relative to the first chute and having its entrance end adjacent the exit end of the first chute, rotatable article transfer means disposed between the exit end of the first chute and the entrance end of the second chute, said transfer means having a passage extending therethrough and being rotatable between an article discharging position wherein one end of the passage registers with the second chute and respective article receiving positions wherein opposite ends of the passage register with the first chute, a first driving element engageable with the article transfer means for rotating the article transfer means in one direction to one of said article receiving positions and a second driving element engageable with the article transfer means for rotating the article transfer means in an opposite direction to the other article receiving position, means associated with the first chute for sensing the relative position of the leading article in the first chute, means controlled by the sensing means for disabling one of the driving elements, and means for reversely returning said transfer means to article discharging position after rotation of the transfer means by one of said driving elements.

10. In an apparatus for uniformly orienting articles having opposite surfaces differentiated by a difference in contour, a downwardly inclined first chute adapted to accommodate a succession of articles with their opposite surfaces positioned at random either right side up or right side down relative to the first chute, a second chute inclined perpendicular to the first chute and having its entrance end adjacent the exit end of the first chute, a rotor disposed between the exit end of the first chute and the entrance end of the second chute, said rotor having a slot extending therethrough dimensioned to slidably accommodate an article and being rotatable between an article discharging position wherein one end of the slot registers with the second chute and respective article receiving positions wherein opposite ends of the slot register with the first chute, said rotor having spaced apart shoulders fixed thereto, a slide longitudinally reciprocable relative to the first chute and having a first driving element engageable with one of the shoulders for rotating the rotor in one direction to one of said article receiving positions and a second driving element engageable with the other shoulder for rotating the rotor in an opposite direction to the other article receiving position, means associated with the first chute for sensing the relative position of the leading article in the first chute, means controlled by the sensing means for disabling one of the driving elements, and means for returning said rotor to article discharging position.

11. In an apparatus for uniformly orienting articles having opposite surfaces differentiated by a difference in contour, a first chute adapted to accommodate a succession of articles with their opposite surfaces positioned at random either right side up or right side down relative to the first chute, a second chute angularly disposed relative to the first chute and having its entrance end adjacent the exit end of the first chute, rotatable article transfer means disposed between the exit end of the first chute and the entrance end of the second chute, said transfer means having a passage extending therethrough and being rotatable between an article discharging position wherein one end of the passage registers with the second chute and respective article receiving positions wherein opposite ends of the passage register with the first chute, a slide longitudinally reciprocable relative to the first chute and having a first driving element for rotating the transfer means to one of said article receiving positions and a second driving element for rotating the transfer means to the other article receiving position, a feeler pin arranged to engage the upwardly facing surface of the leading article in the first chute to gauge the contour thereof, means controlled by the position of the feeler pin relative to the first chute for disabling one of the driving elements, and means for returning said transfer means to article discharging position.

12. In an apparatus for uniformly orienting articles having opposite surfaces differentiated by a difference in contour, a downwardly inclined upper chute adapted to accommodate a succession of articles with their opposite surfaces positioned at random either right side up or right side down relative to the upper chute, a lower chute inclined perpendicular to the upper chute and having its upper end adjacent the lower end of the first chute, a rotor disposed between the lower end of the upper chute and the upper end of the lower chute, said rotor having a passage extending therethrough dimensioned to slidably accommodate an article and being rotatable between an article discharging position wherein one end of the passage registers with the lower chute and respective article receiving positions wherein opposite ends of the passage register with the upper chute, a slide longitudinally reciprocable relative to the upper chute and having a first driving element for rotating the rotor to one of said article receiving positions and a second driving element for rotating the rotor to the other article receiving position, a feeler pin arranged to engage the upwardly facing surface of the leading article in the upper chute to gauge the contour thereof, means controlled by the position of the feeler pin relative to the upper chute for disabling one of the driving elements, and means for returning said rotor to article discharging position.

13. In an apparatus for uniformly orienting articles having opposite surfaces differentiated by a difference in contour, a first chute having a furrowed floor, a cover, and sides dimensioned to accommodate a succession of articles with their opposite surfaces positioned at random either right side up or right side down relative to the first chute, a similar second chute angularly disposed relative to the first chute and having its entrance end adjacent the exit end of the first chute, a rotatable article transfer means disposed between the exit end of the first chute and the entrance end of the second chute, said transfer means having a passage extending therethrough and being rotatable between an article discharging position wherein one end of the passage registers with the second chute and respective article receiving positions wherein opposite ends of the passage register with the first chute, said passage having furrowed internal surfaces, a slide longitudinally reciprocable relative to the first chute and having a first driving element for rotating the transfer means to one of said article receiving positions and a second driving element for rotating the transfer means to the other article receiving position, a feeler pin controller by the slide arranged to engage the upwardly facing surface of the leading article in the first chute, means controlled by the slide for lifting said leading article against the cover of the first chute during its engagement by said feeler pin, means controlled by the position of the feeler pin relative to the first chute cover when the leading article is elevated for disabling one of the driving elements, and means for returning said rotor to article discharging position.

14. In an apparatus for uniformly orienting articles having opposite surfaces differentiated by a difference in contour, a downwardly inclined first chute having a base, a cover, and sides dimensioned to accommodate a succession of articles with their opposite surfaces positioned at random either right side up or right side down relative to the first chute, a second chute inclined perpendicular to the first chute and having its entrance end adjacent the exit end of the first chute, a rotor disposed between the exit end of the first chute and the entrance end of the second chute, said rotor having a passage extending therethrough dimensioned to slidably accommodate an article and being rotatable between an article discharging position such that one end of the passage registers with the second chute and respective article receiving positions such that opposite ends of the passage register with the first chute, a slide longitudinally reciprocable relative to the first chute and having a first driving element for rotating the rotor to one of said article receiving positions and a second driving element for rotating the rotor to the other article receiving position, a feeler pin controlled by the slide arranged to engage the upwardly facing surface of the leading article in the first chute to gauge the contour thereof, a detent controlled by the slide for lifting said leading article against the cover of the first chute during its engagement by said feeler pin, means controlled by the position of the feeler pin relative to the upper chute while the leading article is elevated for disabling one of the driving elements, and means for returning said rotor to article discharging position.

15. In an apparatus for uniformly orienting articles having opposite surfaces differentiated by a difference in contour, a downwardly inclined first chute having a longitudinally furrowed floor, a cover, and adjustable sides dimensioned to accommodate a succession of articles with their opposite surfaces positioned at random either right side up or right side down relative to the first chute, a second chute inclined perpendicular to the first chute having a longitudinally furrowed floor and having its entrance end adjacent the exit end of the first chute, a rotor disposed between the exit end of the first chute and the entrance end of the second chute, said rotor having a passage extending therethrough dimensioned to slidably accommodate an article and being rotatable between an article discharging position such that one end of the passage registers with the second chute and respective article receiving positions such that opposite ends of the passage register with the first chute, said passage having longitudinally furrowed internal surfaces, a pair of eccentric pins on the rotor, a slide longitudinally reciprocable relative to the first chute, said slide having first and second cam surfaces and having a movable first driving element normally engageable with one of said eccentric pins for rotating the rotor to one of said article receiving positions and a fixed second driving element engageable with the other eccentric pin for rotating the rotor to the other article receiving position, a feeler pin controlled by the first cam surface arranged to engage the upwardly facing surface of the leading article in the upper chute to gauge the contour thereof, a lifter controlled by the second cam surface for elevating the leading article against the first chute cover while the feeler pin is engaged therewith, means controlled by the position of the feeler pin relative to the cover of the first chute while said leading article is elevated for moving said first driving element out of engaging relation with said one eccentric pin, and means for returning said rotor to article discharging position.

References Cited in the file of this patent

UNITED STATES PATENTS

| | | |
|---|---|---|
| 699,565 | Pugh | May 6, 1902 |
| 2,505,468 | Forca | Apr. 25, 1950 |
| 2,652,139 | Baehr et al. | Sept. 15, 1953 |